United States Patent
Sonoda et al.

(10) Patent No.: US 7,408,130 B2
(45) Date of Patent: *Aug. 5, 2008

(54) YAG LASER INDUCED ARC FILLER WIRE COMPOSITE WELDING METHOD AND WELDIMG EQUIPMENT

(75) Inventors: Hirobumi Sonoda, Narashino (JP); Kenji Okuyama, Narashino (JP); Junichi Ibukuro, Narashino (JP); Takanori Yahaba, Wako (JP); Masato Takikawa, Wako (JP); Yasutomo Ichiyama, Futtsu (JP); Toshiyasu Ukena, Chiyoda-ku (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 10/508,703

(22) PCT Filed: Apr. 1, 2003

(86) PCT No.: PCT/JP03/04176

§ 371 (c)(1), (2), (4) Date: May 20, 2005

(87) PCT Pub. No.: WO03/082511

PCT Pub. Date: Oct. 9, 2003

(65) Prior Publication Data

US 2005/0211687 A1    Sep. 29, 2005

(30) Foreign Application Priority Data

Apr. 1, 2002 (JP) .............................. 2002-098406
Apr. 1, 2002 (JP) .............................. 2002-098407

(51) Int. Cl.
B23K 9/00    (2006.01)
B23K 26/00   (2006.01)
B23K 26/12   (2006.01)

(52) U.S. Cl. ............................. 219/137 R; 219/121.64; 219/121.63

(58) Field of Classification Search ............. 219/137 R, 219/121.63, 121.64
See application file for complete search history.

(56) References Cited

U.S. PATENT DOCUMENTS

| 5,313,042 A | 5/1994 | Matsuyama et al. ..... 219/121.73 |
| 5,866,870 A * | 2/1999 | Walduck ................ 219/121.45 |

(Continued)

FOREIGN PATENT DOCUMENTS

EP    1122018 A2    8/2001

(Continued)

Primary Examiner—Kevin P Kerns
(74) Attorney, Agent, or Firm—Arent Fox LLP

(57) ABSTRACT

A combined welding method with a filler wire using both a YAG laser and an electric arc, and a combined welding device with a filler wire using both a YAG laser and an electric arc. The welding is performed by directing a laser focus of a YAG laser on base materials and for welding in the vicinity of the focus by a filler wire, connecting a power source for applying a voltage to the filler wire between the filler wire and the base materials for welding, irradiating a YAG laser on the base materials for welding in the connecting condition, whereby an arc is induced to the filler wire by a plume (plasma-activated gas and the metal vapor), and holding the plume generated by YAG laser inside and outside of a keyhole.

12 Claims, 4 Drawing Sheets

U.S. PATENT DOCUMENTS

| | | | |
|---|---|---|---|
| 6,608,281 B2 * | 8/2003 | Ishide et al. | 219/121.78 |
| 7,009,139 B2 * | 3/2006 | Sonoda et al. | 219/121.64 |
| 7,019,256 B2 * | 3/2006 | Sonoda et al. | 219/121.63 |

FOREIGN PATENT DOCUMENTS

| | | | |
|---|---|---|---|
| EP | 1179382 A2 | 2/2002 | |
| JP | 53-137044 | 11/1978 | |
| JP | 56-49195 | * 11/1981 | |
| JP | 56-49195 B2 | * 11/1981 | |
| JP | 58-184084 A | 10/1983 | |
| JP | 61-232079 A | 10/1986 | |
| JP | 62-82194 U | 5/1987 | |
| JP | 4-51271 B2 | 8/1992 | |
| JP | 4-344873 A | 12/1992 | |
| JP | 5-69165 A | 3/1993 | |
| JP | 7-246484 A | 9/1995 | |
| JP | 10-216972 A | 8/1998 | |
| JP | 2000-233287 A | 8/2000 | |
| JP | 2001-150165 A | 6/2001 | |
| JP | 2002-178177 A | 6/2002 | |

* cited by examiner

YAG LASER INDUCED ARC FILLER WIRE COMPOSITE WELDING METHOD AND WELDIMG EQUIPMENT

CROSS-REFERENCE TO RELATED APPLICATION

This application is a National Stage entry of International Application No. PCT/JP03/04176, filed Apr. 1, 2003, the entire specification claims and drawings of which are incorporated herewith by reference.

TECHNICAL FIELD

The invention relates to a combined welding method with a filler wire using both a YAG laser and an electric arc, and relates to combined welding device with a filler wire using both a YAG laser and an electric arc, and specifically relates to a combined welding method with a filler wire using both a YAG laser and an induced arc in which welding is performed using both a YAG laser and an induced arc energy induced at an edge of the filler wire and a combined welding device with a filler wire using both a YAG laser and an induced arc.

BACKGROUND ART

YAG laser welding has characteristics mentioned below, and the welding is predominantly used in robot welding of steel materials used for automobiles, etc.

1. The welding can provide a focused laser, whereby high speed welding with low distortion can be performed.
2. Laser absorptance of the YAG laser welding is several times of that of $CO_2$ laser welding, whereby efficient welding can be performed in the YAG laser welding. Moreover, the wavelength in the YAG laser is a tenth of that in $CO_2$ laser welding, whereby the YAG laser welding is not susceptible to an influence by plasma generated in the welding.
3. The laser beam can be transmitted by a flexible optical fiber in the YAG laser welding, whereby handling is easy and an articulated robot can be used. Moreover, transmittance to a point as far as 100 m away can be performed.
4. Time sharing and power sharing can be exhibited by the laser, whereby high usability can be obtained using separated units together in multiple processing stations.

However, when YAG laser welding is applied to laser welding processes, joint accuracy is necessary in many cases, whereby the process is restricted to processing of thin sheet layers in comparison with other types of welding, for example, gas welding, electric welding and arc welding. As a technique to overcome the restriction, welding methods using both a laser and an arc have been conceived and disclosed.

For example, in Japanese Published Unexamined Application No. 53-137044, Japanese Published Examined Application No. 56-49195, Japanese Published Unexamined Application No. 61-232079, Japanese Published Examined Application No. 4-51271, and Japanese Published Unexamined Application No. 5-69165, welding methods, in which welding is performed by using both a TIG arc and a laser, and base materials are melted by using the TIG arc and a laser is irradiated on the melted pool, whereby penetration depth is increased, is disclosed.

In Japanese Published Unexamined Application No. 53-137044, Japanese Published Unexamined Application No. 61-232079, and Japanese Published Unexamined Application No. 7-246484, welding methods in which welding is performed using both a plasma arc and a laser, and base materials are melted by using the plasma arc and the laser is irradiated on the melted pool, whereby penetration depth is increased, is disclosed.

In Japanese Published Unexamined Application No. 10-216972, a combined welding method, in which welding is performed with a butt welding by combining a laser and a consumable electrode type arc, that is, a combined welding method using a laser which is used first and a consumable electrode type arc which is used second, is disclosed.

In Japanese Published Unexamined Application No. 2000-233287, a welding process device in which an optical axis in a laser system and a nozzle electrode is contained and a laser and an arc are used, is disclosed. In the Application, the nozzle electrode is at a coaxial position with the optical axis, and is set at a position against a work piece. Moreover, a high voltage for arc discharge is fed to the nozzle electrode. Furthermore, a laser is irradiated, whereby the work is melted, resulting in performing welding and processing by arc discharge while maintaining the melted condition.

On the other hand, a welding process technique in which both a laser and a filler wire are used is applied to margin expansion to fluctuation, etc., of a groove gap, suppression of weld bead width in high speed welding, and improvement of under-cutting in the butt portion. As the filler wires used in the technique, a filler wire in which current heating is not performed, a so-called "cold wire" or a filler wire in which current heating is performed, and a so-called "hot wire", are disclosed.

For example, in Japanese Published Unexamined Application No. 4-344873, a hot wire TIG welding, in which power supply is performed from a DC power source to a wire having a diameter of 0.4 mm, wire feed is initiated, contact of wire edge to base materials are detected, and after that, TIG welding is started (p. 4, fifth section, 1.9 and 10), the wire is set in a semi-solid condition by the above-mentioned current heating of the wire from a contact tip, and the wire is fed to a weld pool formed by TIG arc welding, is disclosed. In the Japanese Published Unexamined Application No. 4-344873, it is described that a current heating is performed to an added wire having a diameter of not more than 0.6 mm to form a deposited metal, the added wire is depressed to an edge portion of the contact tip with a wire contacting member through an elastic body, thereby performing the current heating of the wire, plasma arc, electron beam or laser, and in addition, a TIG arc can be used in the melting of the base materials.

The welding in which only a YAG laser is used has the problems mentioned below.

1. In the YAG laser, welding is performed by focusing a light beam, thereby increasing energy density. However, the spot diameter in the focused laser is 0.3 to 1 mm.

Therefore, in the case of the butt welding, when a butt gap (for example, FIG. 3C) exists, the laser goes through the gap, and welding defects are generated. Accordingly, the cutting of edge in a weld zone in the welded material 41, 42 and method for holding the weld zone is rigidly requested.

Moreover, in the case of a lap welding, a joint boundary face width of a penetration bead from an upper plate 44 to a lower plate 43 (for example, FIG. 3D) is narrow, whereby excellent joint strength cannot be obtained.

Furthermore, also in the case of a fillet welding of members 45 and 46, the penetration width (for example, FIG. 3E) cannot be adequately obtained similar to the lap welding, whereby excellent joint strength cannot be obtained.

Additionally, when a welding is performed by simultaneously feeding filler wire to a YAG laser weld zone for the purpose of improving reinforcement of the weld and surface bead, energy is consumed in melting of the filler wire, whereby weldability is decreased.

2. Initial cost is high for the YAG laser device, whereby equipment cost is extremely high in the case of introducing multiple units for an installation, for example, in an automobile production line.

In Japanese Published Unexamined Application (utility model) No. 62-82194, a nozzle structure mentioned below is disclosed. That is, a laser beam is absorbed by a plasma-activated gas and a metal vapor, that is a plume, in a keyhole generated in base materials for welding by laser irradiation or above the keyhole in the laser welding, whereby it is regarded that a welding in which the penetration is deep cannot be performed, the plume is guided to an exhaust path formed outside of a laser path by blowing a shielding gas into the keyhole, and an aspiration and exhaust are performed. The structure aims to effectively increase laser heat input for the base materials. In the YAG laser wavelength, a YAG laser is rarely absorbed by a plasma-activated gas and a metal vapor, that is a plume, in the keyhole or above the keyhole. When exhaust is performed by absorbing a YAG laser by a plasma-activated gas and a metal vapor, strength for holding the keyhole down disappears, whereby the depth of the penetration becomes shallow.

In the Japanese Published Unexamined Application No. 53-137044, the Japanese Published Examined Application No. 56-49195, the Japanese Published Unexamined Application No. 61-232079, the Japanese Published Examined Application No. 4-51271, and the Japanese Published Unexamined Application No. 5-69165, a combined welding by a TIG and a laser in which base materials are melted by using a TIG arc to obtain a weld pool of the base materials and a laser is irradiated on the weld pool, whereby the penetration depth is increased, is disclosed. The disclosure in the documents aims to form a shallow and a broad weld pool by the TIG and to obtain a narrow and deep penetration by the laser. Melted width of the surface of the base materials is increased by the TIG and by a broad weld pool, for example, the butt gap shown in FIG. 3C is filled up, deep penetration is formed by the laser, for example, the penetration width shown in FIG. 3E is broadened, that is, penetration is deepened, whereby weldability and weld quality are increased in comparison with using the laser alone.

However, only the laser penetrates to deep locations, whereby penetration width is narrow and welding strength is low. For example, joint boundary face width in the lap welding shown in FIG. 3D is narrow, whereby increasing of the width is desired. The demand exists similarly for the plasma arc in the Japanese Published Unexamined Application No. 7-246484 and the Japanese Published Unexamined Application No. 10-216972, and in the Japanese Published Unexamined Application No. 2000-233287.

As a welding method in which a laser and a filler wire are both used, conventionally, a filler wire in which current heating is not performed, that is, a so-called "cold wire" is generally used, a part of the laser energy for melting the base materials are consumed by the melting of the filler wire, whereby there is a problem in that weldability is decreased. On the other hand, in the Japanese Publication Unexamined Application No. 4-344873, hot wire TIG using a filler wire having a diameter of not more than 0.6 mm with a purpose of forming a fusil and stable welding bead in high speed welding of a thin plate is disclosed. Moreover, in the document, changing the TIG arc to a laser irradiation is proposed.

However, sufficient penetration depth cannot be obtained, whereby welding strength is low. Specifically, the technique in the proposal is unsuitable for the lap welding and fillet welding in which deep penetration depth is desired.

DISCLOSURE OF THE INVENTION

A first purpose of the present invention is to expand the gap margin in the butt welding and to effectively perform penetration welding in lap welding and fillet welding.

In order to achieve the first purpose, in the first embodiment of the present invention, the laser irradiation position of the YAG laser on base materials for welding (31, 32) or in the vicinity of the position (8) is targeted by a filler wire (20), a power source for applying a voltage to the filler wire (22) is set between the filler wire and the base materials for welding in a condition of not contacting the filler wire with the base material for welding, the YAG laser is irradiated on the base materials for welding, whereby an arc is induced in the filler wire by a plasma-activated gas and a metal vapor by a YAG laser, the arc is maintained, the filler wire is fed to the vicinity of the laser irradiation position of the YAG laser in a heated condition so as not to contact the filler wire with a weld pool, the plasma-activated gas and the metal vapor contributed to stably maintaining of the induced arc are kept inside and outside a keyhole, whereby a combined welding using both a YAG laser and the induced arc is performed (see FIG. 1).

Moreover, a second purpose of the present invention is to expand the gap margin in the butt welding for a thick plate and to prevent lack of height of reinforcement of a weld, and to effectively perform penetration welding in the lap welding for a thick plate and fillet welding.

In order to achieve the second purpose, in the second embodiment of the present invention, the vicinity of the laser irradiation position (8) of the YAG laser on base materials for welding (31 and 32) is targeted by a filler wire (20), a power source for heating the filler wire (22) is set between the filler wire and the base materials for welding so as not to contact the filler wire with the base materials for welding, the YAG laser is irradiated on the base materials for welding, whereby an arc is induced in the filler wire by a plasma-activated gas and a metal vapor by the YAG laser, the arc is maintained, the filler wire is fed to the vicinity of the laser irradiation position of the YAG laser in a heating condition so as not to contact the filler wire with a weld pool, the plasma-activated gas and the metal vapor contribute to stably maintaining the induced arc are kept inside and outside a keyhole, whereby a combined welding using both a YAG laser and the induced arc is performed (see FIG. 2).

Additionally, to facilitate understanding, reference numerals which are shown in the Figures and are signed for response elements or corresponding matters in the following Practical Example are also described in parentheses as exemplifications for reference. This is the same hereinafter.

According to the present invention mentioned above, in the typical use of both a laser and TIG welding, radio-frequency sputtering is performed between the electrode and base materials, whereby gas contact is lost, resulting in the generation of arcs. However, radio frequency is not necessary in this case. In this case, the plasma-activated gas and the metal vapor, that is, a plume, obtained by the YAG laser and the arc reach high temperatures and pressures, whereby melted metal is held down, and the welding result in which the speed is not less than the speed when using only a laser, bead width is broad, and penetration is deep can be obtained by this heat conduction.

BEST MODE FOR CARRING OUT THE INVENTION

Hereinafter, preferred embodiments of the present invention will be described.

(1) The First Embodiment

In a Practical Example of the first embodiment of the present invention, a welding is performed by setting a ratio Vf/V of a feed rate Vf to a welding speed V of the filler wire to be less than 1, that is, setting the feed rate Vf of the filler wire to be less than the welding speed V, resulting in controlling the feed rate Vf of the filler wire to be a rate in which the filler wire does not contact the weld pool. For example, a current value and voltage value between the filler wire and the base materials for welding are detected by a detector circuit (26), whereby a resistance value is calculated. Then, when a ratio Vf/V of a feed rate Vf to a welding speed V of the filler wire is less than 1, when the detected resistance value deviates to a higher value side, the feed rate of the filler wire is increased. On the other hand, when the detected resistance value is deviated to a lower value side, the feed rate of the filler wire is decreased. In this way, a feed rate Vf of the filler wire is controlled so as to set a ratio Vf/V of a feed rate Vf to a welding speed V of the filler wire to be less than 1.

In the above-mentioned way, a welding gap margin in a butt joint of comparative thin plate can be specifically expanded, a lack of the height of the reinforcement of the weld can be solved, and proper shaping in reinforce of the weld (preventing convex shape) can be effectively achieved. On the other hand, when a ratio Vf/V of a feed rate Vf to a welding speed V of the filler wire is not less than 1, the shape of the reinforce of weld is convex, and penetration depth is decreased.

As other effects, a joint boundary face width in a lap welding for a thin plate can be increased, and the penetration width in fillet welding can be increased, whereby high joint strength can be obtained, and a stable welding result having no welding defect can be obtained.

Additionally, wire heat input by the induced arc contributes to melting the filler wire, whereby weldability is not decreased using the filler wire. Furthermore, heat input to base materials is generated by the induced arc, whereby weldability equivalent to weldability in the case of using a YAG laser of a high output can be obtained by using a YAG laser of low output. The laser can be easily fed to multiple laser irradiation heads by dividing the laser beam from one YAG laser source, whereby equipment cost per laser irradiation head can be easily decreased.

The purpose and characteristics of the present invention will be apparent from the description of the following Practical Examples while referring to the Figures.

Figure 1:
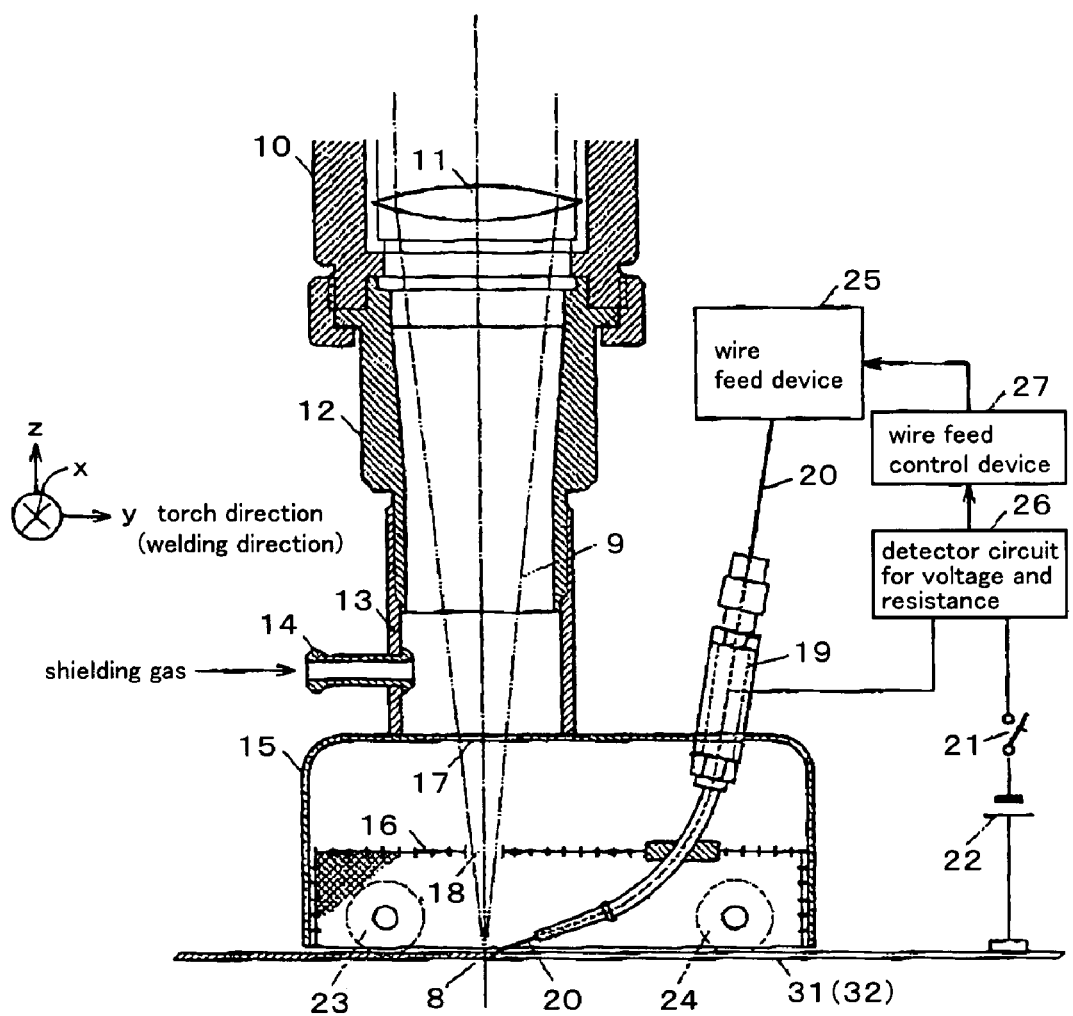
FIG. 1 is a longitudinal section showing a welding head portion in a combined welding device using both a YAG laser and an induced arc filler wire of a Practical Example of the first embodiment of the present invention.

FIG. 1 shows a combined welding device using both a YAG laser and an induced arc filler wire of a Practical Example of the first embodiment of the present invention. The YAG laser beam 9 is guided from the YAG laser source not shown in the FIG. 1 through a fiber-optic cable not shown in the FIG. 1 to the YAG irradiation head 10, the beam 9 is focused through the lens 11 in the head 10, and the beam 9 is directed to the focus 8 (irradiation position) through an objective sleeve 12 and a hookup sleeve 13.

Below the hookup sleeve 13, an objective hood 15 is firmly fixed. A metal mesh 16 for straightly flowing gas is in the hood 15, and internal space in the hood 15 is divided into an upper space which is a gas feed space and a lower space which is a welding space by the metal mesh 16. The hood 15 and the metal mesh 16 have openings 17, 18 which allow the laser beam 9 to pass to the focus 8. A wire guide 19 is passed through the hood 15 and the metal mesh 16, and it is firmly fixed with the hood 15. A filler wire 20 is fed from a wire feed device 25 to the wire guide 19, and the filler wire 20 is fed from a wire feed tip under the wire guide 19 to the vicinity of the laser focus 8. Wheels 23 and 24 are in a lower part of the hood 15 so as to open a minute gap between a base material for welding 32 and the bottom of hood 15.

When a butt welding is performed with the thin plates 31 and 32 shown in the FIG. 1, shielding gas is blown to hookup sleeve 13 through pipe sleeve 14 disposed in the hookup sleeve 13, a power switch 21 in a power source for applying voltage 22 closes, no-load voltage is applied to the filler wire between the filler wire and thin plates 31 and 32 which are not in contact with the filler wire, and irradiation of the YAG laser beam 9 on the thin plates 31 and 32 begins. An arc is induced between filler wire 20 and thin plates 31 and 32 by an action of the plume generated by the irradiation. If a position directed by the filler wire is outside of the plume generated by the laser irradiation, the arc is not induced, whereby the position directed by the filler wire is set so as to position the edge of the filler wire to be inside of the plume generated by the laser irradiation. After the arc is induced to the filler wire, driving of the YAG irradiation head 10 in the y direction begins, and feeding of the filler wire 20 begins in order not to contact the filler wire 20 with the weld pool. A stable welding condition can be obtained in the thin plate in the above-mentioned manner. That is, laser irradiation welding and arc welding are concurrently conducted.

In the welding condition, the shielding gas is blown from pipe sleeve 14 into hookup sleeve 13, the shielding gas is advanced from the hookup sleeve 13 through opening 17 to a gas feed chamber which is above the metal mesh 16 for straightly flowing gas in hood 15. Then, the shielding gas is diffused in the x and y directions, the gas is passed in the metal mesh 16 for straightly flowing gas, whereby the gas is straightly flowed in approximately the vertical direction, descends to the surface of the base material 32 for welding, and exits the hood through the lower edge of the hood 15 along the surface. According to the current of the shielding gas, the internal space of the hood 15 is filled with the shielding gas, and in the welding space on the lower side of the metal mesh 16, the shielding gas is slowly and straightly flowed in the vertical direction, and the vicinity of the focus 8, that is, the keyhole, by laser irradiation and the plume inside and outside of the keyhole is enveloped by the shielding gas.

The weld pool in the focus 8 and the filler wire 20 are blocked off from the air (oxygen) by the enveloping gas, whereby oxidation of the weld pool in the focus 8 and the filler wire 20 can be prevented, and flowing of the plume inside and outside of the keyhole in all directions is suppressed, whereby the plume can be held inside and outside of the keyhole.

The voltage and current between base materials for welding 31 and 32 and filler wire 20 are detected by a detector circuit 26, a resistance value is calculated by the voltage value and current value, and an electrical signal indicating the resistance value is provided with the wire feed control device 27. The resistance value is evaluated by the wire feed control device 27 whether or not the value is inside of a setting range in which a setting value (a predetermined value correspond to an induced arc length) is central. Then, when the detected resistance value deviates to a higher value side, increasing the feed rate is indicated to the wire feed device. On the other hand, when the detected resistance value deviates to a lower value side, decreasing the feed rate is indicated to the wire feed device. That is, controlling is performed so as to set a ratio Vf/V of a feed rate Vf to a welding speed V of the filler wire to be less than 1, to realize the predetermined induced arc length.

Figure 3A:
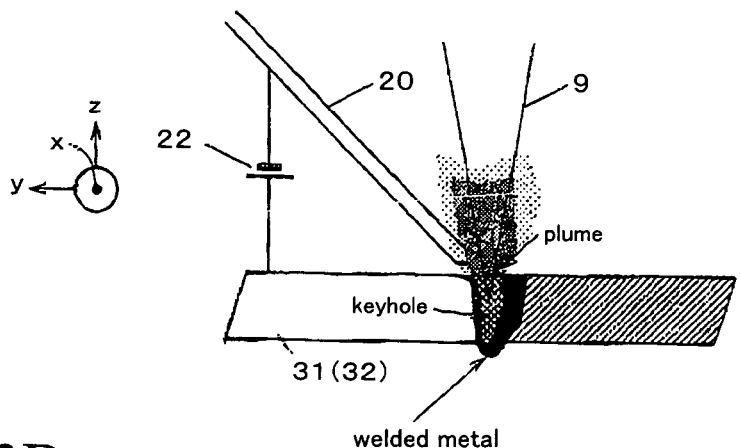
FIG. 3A is an expanded pattern diagram showing the vicinity of focal point 8 shown in FIG. 1.

FIG. 3A shows a pattern diagram showing a keyhole. The plume in the keyhole explosively reaches high temperature and high pressure conditions by irradiation of the YAG laser, that is, by injection of the high density energy, and the melted metal in the keyhole is pressurized by the plume, whereby the bottom of the keyhole is melted, resulting in deep penetration. Additionally, when the shielding gas stream which strongly stops the plume, that is, which blows the plume away, is focused on a focus 8, the induced arc is not stably sustained, and the penetration becomes extremely shallow. Therefore, in order to deepen the penetration, it is essential to hold the plume in the keyhole as much as possible. The above-mentioned points were confirmed by the following experiments.

Figure 3B:
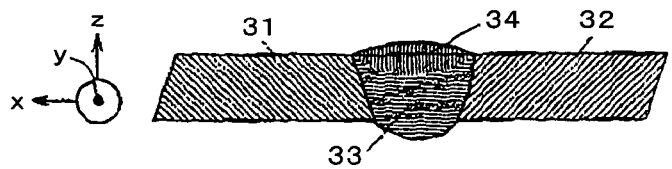
FIG. 3B is an expanded pattern diagram showing a weld bead obtained by a combined welding method using both a YAG laser and an induced arc filler wire using the welding device shown in FIG. 1.
Figure 3C:
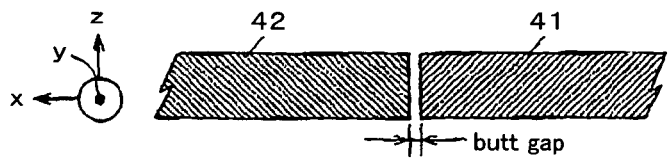
FIG. 3C is an enlarged sectional view showing a butt gap in a general butt welding.
Figure 3D:
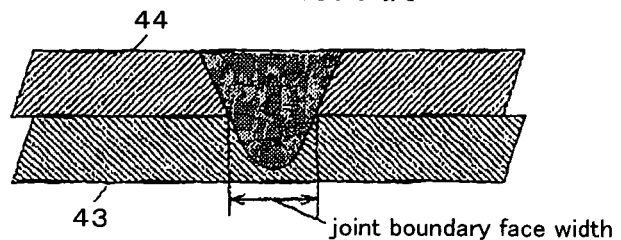
FIG. 3D is an enlarged sectional view showing a joint boundary face width in lap welding.
Figure 3E:
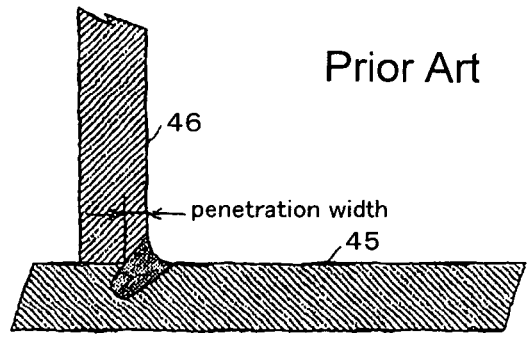
FIG. 3E is an enlarged sectional view showing penetration width in fillet welding.

A butt welding bead shown in the FIG. 3B could be obtained by the above-mentioned welding operation. In the FIG. 3B, a reference numeral 33 shows a portion in which base materials are melted and solidified, and a reference numeral 34 above the reference numeral 33 shows a bead formed by the filler wire 20. In the experiment, a lack of the reinforcement of the weld does not occur, whereby a suitable shape in the reinforcement of weld and a suitable depth of penetration can be obtained. Moreover, high speed welding in which quality is stable can be performed in the experiment. A welding condition for this situation is as follows.

(Welding Case 1)
Base material for welding 31: material A5052, plate thickness 2 mm
Base material for welding 32: material A5052, plate thickness 2 mm, butt joint
YAG laser: output 4 kW, no assist gas (center gas)
Non-load voltage: 20 V, Current: 120 A
Shielding gas: Ar 25 liter/min
Welding speed: 4 m/min, butt joint
Filler wire: standard A5356WY, feed rate: 2 m/min (Welding Case 2)
Base material for welding 31: material A5052, plate thickness 1 mm
Base material for welding 32: material A5052, plate thickness 1 mm, butt joint
YAG laser: output 3.5 kW, no assist gas (center gas)
Non-load voltage: 20 V, Current: 100 A
Shielding gas: Ar 25 liter/min
Welding speed: 6 m/min, butt joint
Filler wire: standard A5356WY, feed rate: 2 m/min As mentioned above, an arc is induced by the plume generated by laser irradiation, whereby arc activation by applying high voltage at a radio-frequency is not necessary. Moreover, due to adding the YAG laser welding to arc welding, heat input to the surface layer of the base materials is large. Therefore, even when a bit of butt gap exists, a reliably stable welding, in which lack of the reinforcement of welding does not exist, the penetration is deep, and the joint boundary face width is broad, can be performed, whereby high speed welding can be performed.

(2) The Second Embodiment

Moreover, in a Practical Example of the second embodiment of the present invention, the feed rate of the filler wire is controlled, in order to set a ratio Vf/V of a feed rate Vf to a welding speed V of the filler wire to be not less than 1, that is, to set the feed rate Vf of the filler wire to be not less than the welding speed V, thereby controlling the feed rate Vf of the filler wire to be a rate at which the filler wire does not contact the weld pool. For example, current value and voltage value between the filler wire and the base materials for welding are detected, whereby a resistance value between the filler wire and the base materials for welding is calculated. Then, when the detected resistance value deviates to a high value side, feed rate of the filler wire is increased, and when the detected resistance value deviates to a low value side, feed rate of the filler wire is decreased, so as to set the resistance value to be in a setting range corresponding to a range of feed rate in which the feed rate of the filler wire is not less than the welding speed and the filler wire is contacted to the weld pool in the condition of heating the wire by a power source for heating.

In the above-mentioned way, a welding gap margin in a butt joint of comparative thick plate can be specifically expanded, a lack of the height of the reinforcement of weld in the butt joint can be solved, a joint boundary face width can be increased with increasing the penetration depth in the lap welding for thick plate, a lack of the height of the reinforcement of weld in the lap welding for thick plate can be solved, and a penetration width in a fillet welding can be increased, etc. Therefore, excellent joint strength can be obtained, whereby a stable welding result in which welding defects do not exist can be obtained. On the other hand, when the ratio Vf/V is less than 1, a lack of the reinforcement of weld and dripping by melting are generated.

Additionally, wire heat input by the induced arc and heat generated by heating the resistance in applying on electricity to the filler wire contribute to melting the filler wire, whereby weldability is not decreased by additionally using the filler wire. Furthermore, heat input to base materials is generated by the induced arc, whereby weldability equivalent to weldability in the case of using a YAG laser of a high output can be obtained by using a YAG laser of low output. The laser can be easily fed to multiple laser irradiation heads by dividing the laser from one YAG laser source, whereby equipment cost per laser irradiation head can be easily decreased.

Figure 2:
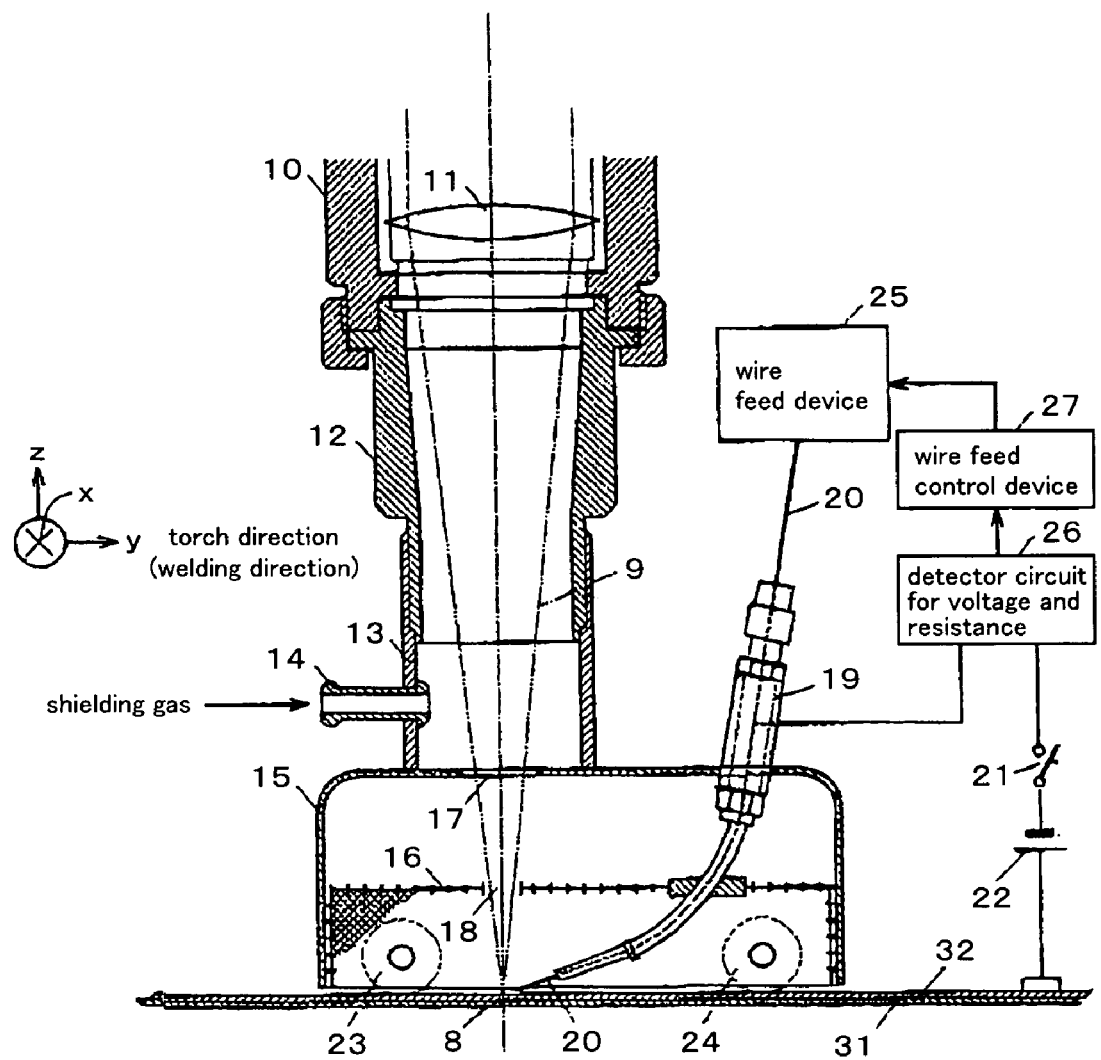
FIG. 2 is a longitudinal section showing a welding head portion in a combined welding device using both a YAG laser and an induced arc filler wire of a Practical Example of the second embodiment of the present invention.

FIG. 2 shows a combined welding device using a YAG laser and an induced arc filler wire of a Practical Example of the second embodiment of the present invention. The YAG laser beam 9 is guided from the YAG laser source not shown in the FIG. 2 through a fiber-optic cable not shown in the FIG. 2 to the YAG irradiation head 10, the beam 9 is focused through the lens 11 in the head 10, and the beam 9 is directed to the focus 8 (irradiation position) through an objective sleeve 12 and a hookup sleeve 13.

Below the hookup sleeve 13, an objective hood 15 is firmly fixed. A metal mesh 16 for straightly flowing gas is in the hood 15, and internal space in the hood 15 is divided into an upper space which is a gas feed space and a lower space which is a welding space by the metal mesh 16. The hood 15 and the metal mesh 16 have openings 17 and 18 which pass the laser beam 9 to the focus 8.

A wire guide 19 is passed through the hood 15 and the metal mesh 16, and is firmly fixed with the hood 15. A filler wire 20 is fed from a wire feed device not shown in the FIG. 2 to the wire guide 19, and the filler wire 20 is fed from a wire feed tip under the wire guide 19 to the vicinity of the laser focus 8. Wheels 23 and 24 are in the lower part of the hood 15 so as to open a minute gap between a base material for welding 32 and the bottom of hood 15.

When a butt welding is performed with the base materials 31 and 32 shown in FIG. 2, shielding gas is blown to hookup sleeve 13 through pipe sleeve 14 disposed in the hookup sleeve 13, a power switch 21 in a power source 22 for heating the wire closes, no-load voltage is applied to the filler wire 20 between filler wire and base materials 31 and 32 which are not contacted with the filler wire, and irradiation of the YAG laser beam 9 on the base materials 31 and 32 begins. An arc is induced between filler wire 20 and the base materials 31 and 32 by a function of a plume generated by the irradiation. If a position directed by the filler wire is outside of the plume generated by the laser irradiation, the arc is not induced, whereby the position directed by the filler wire is set so as to position the edge of the filler wire to be inside of the plume generated by the laser irradiation. After the arc is induced to the filler wire, driving of the YAG irradiation head 10 in the y direction begins, and feeding of the filler wire 20 begins in order to obtain a feed rate in which the filler wire 20 is contacted with the weld pool. A stable welding condition can be obtained in the above-mentioned manner. That is, laser irradiation welding and arc welding are concurrently carried out.

In the welding condition, the shielding gas is blown from pipe sleeve 14 into hookup sleeve 13, the shielding gas is advanced from the hookup sleeve 13 through opening 17 to a gas feed chamber which is above the metal mesh 16 for straightly flowing gas in hood 15. Then, the shielding gas is diffused in the x and y directions, the gas is passed in the metal mesh 16 for straightly flowing gas, whereby the gas is straightly blown in approximately the vertical direction, descends to the surface of the base material 32 for welding, and exits the hood through the lower edge of the hood 15 along the surface. According to the current of the shielding gas, the internal space of the hood 15 is filled with the shielding gas, and in the welding space on the lower side of the metal mesh 16, the shielding gas is slowly and straightly flowed in the vertical direction, and the vicinity of the focus 8, that is, the keyhole, by laser irradiation, and the plume inside and outside of the keyhole is enveloped by the shielding gas.

The weld pool in the focus 8 and the filler wire 20 are blocked off from the air (oxygen) by the enveloping gas, whereby oxidation of the weld pool in the focus 8 and the filler wire 20 can be prevented, and flowing the plume inside and outside of the keyhole in all directions is suppressed, whereby the plume can be held inside and outside of the keyhole.

The voltage and current between base materials for welding 31 and 32 and filler wire 20 are detected by a detector circuit 26, resistance value between the two is calculated by the voltage value and current value, and an electrical signal showing the resistance value is provided with the wire feed control device 27. The detected resistance value is evaluated by the wire feed control device 27 whether or not the value is of a predetermined value between the base materials for welding and filler wire in setting range in which a ratio Vf/V of a feed rate Vf to a welding speed V of the filler wire is not less than 1. Then, when the detected resistance value deviates to a higher value side, increasing the feed rate is indicated to the wire feed device 25. On the other hand, when the detected resistance value deviates to a lower value side, decreasing the feed rate is indicated to the wire feed device 25. In the above-mentioned manner, the feed rate is increased or decreased by the wire feed device 25 in response to the indication to the device 25. As is mentioned above, filler wire 20 is heated by power source for heating 22, and the filler wire 20 is fed at a feed rate of setting a ratio Vf/V of a feed rate Vf to a welding speed V of the filler wire to be not less than 1.

Figure 4A:
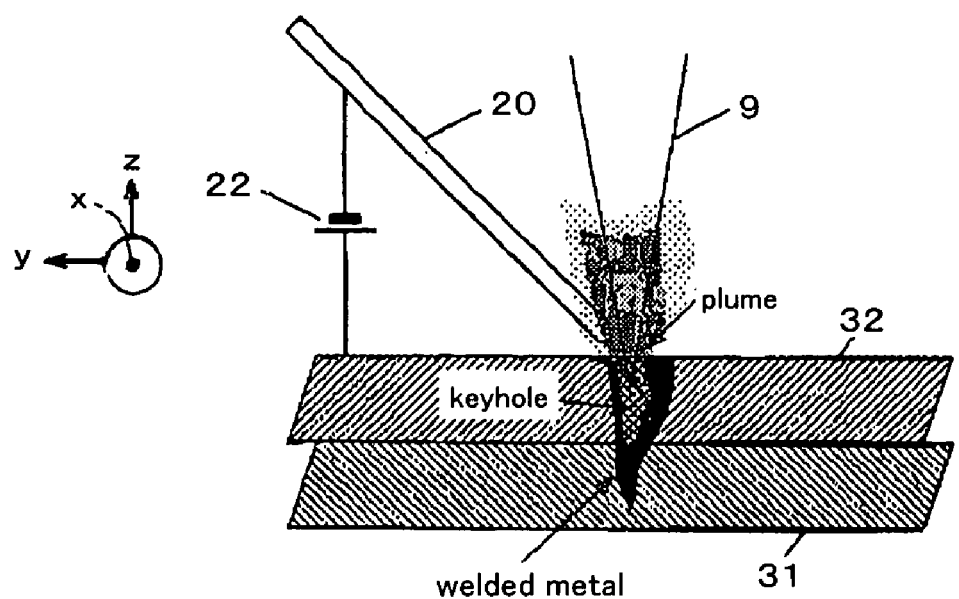
FIG. 4A is an expanded pattern diagram showing the vicinity of focal point 8 shown in the FIG. 2.

FIG. 4A shows a pattern diagram showing a keyhole. The plume in the keyhole explosively reaches high temperature and high pressure conditions by irradiation by the YAG laser, that is, by injection of the high density energy, and the melted metal in the keyhole is pressurized by the plume, whereby the bottom of the keyhole is melted, resulting in deep penetration. Additionally, when the shielding gas stream which strongly steps the plume, that is, which blows the plume away, is focused at the focus 8, the induced arc is not stably sustained, and the penetration becomes extremely shallow. Therefore, in order to deepen the penetration, it is essential to hold the plume in the keyhole as much as possible. The above-mentioned points were confirmed by the following experiments.

Figure 4B:
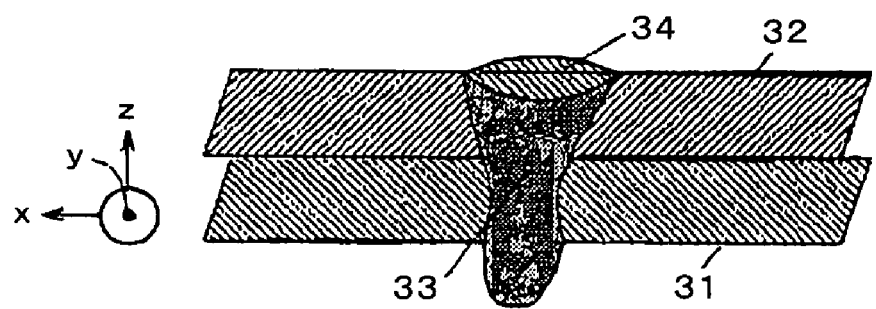
FIG. 4B is an expanded pattern diagram showing a weld bead obtained by a combined welding method using both a YAG laser and an induced arc filler wire using the welding device shown in FIG. 2.

A lap welding bead shown in the FIG. 4B could be obtained by the above-mentioned welding operation. In the FIG. 4B, a reference numeral 33 shows a portion in which base materials are melted and solidified, and a reference numeral 34 above the reference numeral 33 shows a bead formed by the filler wire 20. In the experiment, a high speed welding in which a joint boundary face width is broad, a penetration is deep, and quality is stable can be performed. Welding conditions in this situation is as follows.

Base material for welding 31: material A5052, plate thickness 2 mm

Base material for welding 32: material A5052, plate thickness 2 mm, lap joint

YAG laser: output 4 kW, no assist gas (center gas)

Non-load voltage: 20 V, Current: 150 A

Shielding gas: Ar 25 liter/min

Welding speed: 2 m/min, lap joint

Filler wire: standard A5356WY, feed rate: 2 m/min

As mentioned above, an arc is induced by the plume generated by laser irradiation, whereby arc activation by applying high voltage in radio-frequency is not necessary. Moreover, due to adding the YAG laser welding to arc welding, heat input to the surfaces layer of the base materials is large. Therefore, even when a bit of butt gap is changed, reliable stable welding, in which a bead having preferable height and shape of the reinforcement of weld can be obtained, can be performed, whereby high speed welding can be performed. Moreover, the plume can be held in the keyhole by YAG laser irradiation and in the vicinity of the keyhole, the present invention can be applied to a welding in which the penetration is deep and joint boundary face width is broad.

The invention claimed is:

1. A combined welding method with a filler wire using both a YAG laser and an induced arc, comprising:
   directing a laser irradiation position of a YAG laser on base materials to be welded by a filler wire;
   dividing an internal space of a hood covering a welding surface of the base materials to be welded into a welding space which faces the welding surface and a gas feed space on an opposite side of the welding space from the welding surface by a member for straightly flowing a gas having plural openings from the gas feed space to the welding space;
   connecting a power source for applying voltage for the filler wire between the filler wire and the base materials to be welded;
   irradiating the YAG laser on the base materials to be welded, whereby a keyhole is generated at an irradiated portion of the welding surface of the base materials, and a plasma-activated gas and a metal vapor are generated;
   feeding the filler wire in a vicinity of the generated plasma-activated gas and the metal vapor, whereby an arc is induced to the filler wire by a function of the plasma-activated gas and the metal vapor;
   feeding the filler wire to a welding portion of the base materials to be welded; and
   welding using both the YAG laser and the induced arc while holding the plasma-activated gas and the metal vapor in the keyhole, wherein
   the YAG laser is irradiated to the base materials through the hood and the openings of the member for straightly flowing the gas, and a shielding gas is fed to the gas feed space, whereby a shielding gas atmosphere is set in a vicinity of the laser irradiation position and the edge of the filler wire through the member for straightly flowing the gas, and the plasma-activated gas and the metal vapor in the keyhole in all directions is suppressed by the shielding gas.

2. The combined welding method with a filler wire using both a YAG laser and an induced arc according to claim 1, wherein a ratio Vf/V of a feed rate Vf to a welding speed V of the filler wire is less than 1.

3. The combined welding method with a filler wire using both a YAG laser and an induced arc according to claim 1, wherein the step of dividing the internal space comprises dividing the internal space substantially evenly between the welding space and the gas feed space.

4. The combined welding method with a filler wire using both a YAG laser and an induced arc according to claim 3, wherein the step of dividing the internal space substantially evenly comprises dividing the internal space with a metal mesh for straightly flowing gas in the internal space in the hood.

5. A combined welding method with a filler wire using both a YAG laser and an induced arc, comprising:
   directing a laser irradiation position of a YAG laser on base materials to be welded by a filler wire;
   dividing an internal space of a hood covering a welding surface of the base materials to be welded into a welding space which faces the welding surface and a gas feed space on an opposite side of the welding space from the welding surface by a member for straightly flowing a gas having plural openings from the gas feed space to the welding space;
   connecting a power source for heating the filler wire between the filler wire and the base materials to be welded;
   irradiating the YAG laser on the base materials to be welded, whereby a keyhole is generated at an irradiated portion of the welding surface of the base materials, a plasma-activated gas and a metal vapor are generated;
   feeding the filler wire in a vicinity of the generated plasma-activated gas and the metal vapor, whereby an arc is induced to the filler wire by a function of the plasma-activated gas and the metal vapor;
   feeding the filler wire to a welding portion of the base materials to be welded; and
   welding using both the YAG laser and the induced arc while holding the plasma-activated gas and metal vapor in the keyhole, wherein
   the YAG laser is irradiated to the base materials through the hood and the openings of the member for straightly flowing the gas, and a shielding gas is fed to the gas feed space, whereby a shielding gas atmosphere is set in a vicinity of the laser irradiation position and the edge of the filler wire through the member for straightly flowing the gas, and the plasma-activated gas and the metal vapor in the keyhole in all directions is suppressed by the shielding gas.

6. The combined welding method with a filler wire using both a YAG laser and an induced arc according to claim 5, wherein a ratio Vf/V of a feed rate Vf to a welding speed V of the filler wire is not less than 1.

7. The combined welding method with a filler wire using both a YAG laser and an induced arc according to claim 5, wherein the step of dividing the internal space comprises dividing the internal space substantially evenly between the welding space and the gas feed space.

8. The combined welding method with a filler wire using both a YAG laser and an induced arc according to claim 7, wherein the step of dividing the internal space substantially evenly comprises dividing the internal space with a metal mesh for straightly flowing gas in the internal space in the hood.

9. A combined welding device with a filler wire using both a YAG laser and an induced arc, comprising:
   a YAG laser welding head;
   a hood, which is fitted at an edge of the head, has an inlet opening through which the YAG laser irradiated from the head enters the hood, and an outlet, opposite the inlet at a side facing base materials to be welded, through which the YAG laser exits the hood;
   a filler wire guide, which is fixed with the hood, guides a filler wire to direct a laser irradiation position of the YAG laser welding head on the base materials to be welded;
   a gas feed opening for feeding a shielding gas to the hood through said inlet opening through which the YAG laser irradiated from the head enters the hood, and from a position removed from the filler wire, so as not to make the gas stream along a circumferential surface of the filler wire guide;
   a power source by which an arc is induced to the filler wire by plasma-activated gas and metal vapor generated by irradiating the YAG laser to the base materials to be welded between the base materials to be welded and the filler wire, and by which a level of electric power in which the arc is stably maintained is fed after inducing the arc;
   a wire feed device for feeding the filler wire so as to stably maintain the arc; and a member for straightly flowing a gas having plural openings from the gas feed space to the welding space, and for dividing an internal space of a hood covering a welding surface of the base materials to be welded into a welding space which faces the welding surface and a gas feed space on an opposite side of the welding space from the welding surface, wherein the filler wire guide and the filler wire are passed through the member for straightly flowing the gas, and the laser irradiation position of the YAG laser welding head on the base materials to be welded or the vicinity of the laser irradiation position is directed by the guide and the wire, wherein the YAG laser is irradiated to the base materials through the hood and the openings of the member for straightly flowing the gas, and a shielding gas is fed to the gas feed space, whereby a shielding gas atmosphere is set in a vicinity of the laser irradiation position and the edge of the filler wire through the member for straightly flowing the gas, and the plasma-activated gas and the metal vapor in the keyhole in all directions is suppressed by the shielding gas.

10. The combined welding device with a filler wire using both a YAG laser and an induced arc according to claim 9, where in a ratio Vf/V of a feed rate Vf to a welding speed V of the filler wire is less than 1.

11. A combined welding device with a filler wire using both a YAG laser and an induced arc, comprising:

a YAG laser welding head;

a hood, which is fitted at an edge of the head, has an inlet opening through which the YAG laser irradiated from the head enters the hood, and an outlet, opposite the inlet at a side facing base materials to be welded, through which the YAG laser exits the hood;

a filler wire guide which is fixed with the hood, guides a filler wire to direct a laser irradiation position of the YAG laser welding head on the base materials to be welded;

a gas feed opening for feeding a shielding gas to the hood through said inlet opening through which the YAG laser irradiated from the head enters the hood, and from a position removed from the filler wire, so as not to make the gas stream along a circumferential surface of the filler wire guide;

a power source by which an arc is induced to the filler wire by plasma-activated gas and metal vapor generated by irradiating the YAG laser to the base materials to be welded between the base materials to be welded and the filler wire, and by which the filler wire is heated;

a wire feed device for feeding the filler wire so as to stably maintain the arc; and a member for straightly flowing a gas having plural openings from the gas feed space to the welding space, and for dividing an internal space of a hood covering a welding surface of the base materials to be welded into a welding space which faces the welding surface and a gas feed space on an opposite side of the welding space from the welding surface, wherein the filler wire guide and the filler wire are passed through the member for straightly flowing the gas, and the laser irradiation position of the YAG laser welding head on the base materials to be welded or the vicinity of the laser irradiation position is directed by the guide and the wire, wherein the YAG laser is irradiated to the base materials through the hood and the openings of the member for straightly flowing the gas, and a shielding gas is fed to the gas feed space, whereby a shielding gas atmosphere is set in a vicinity of the laser irradiation position and the edge of the filler wire through the member for straightly flowing the gas, and the plasma-activated gas and the metal vapor in the keyhole in all directions is suppressed by the shielding gas.

12. The combined welding device with a filler wire using both a YAG laser and an induced arc according to claim 11, where in a ratio Vf/V of a feed rate Vf to a welding speed V of the filler wire is less than 1.

* * * * *